(12) United States Patent
Uldry

(10) Patent No.: US 8,900,526 B2
(45) Date of Patent: Dec. 2, 2014

(54) JOINT FOR DEVICE FOR METERING LIQUIDS

(75) Inventor: Jean-Pierre Uldry, La Conversion (CH)

(73) Assignee: Socorex Isba S.A., Ecublens (CH)

( * ) Notice: Subject to any disclaimer, the term of this patent is extended or adjusted under 35 U.S.C. 154(b) by 333 days.

(21) Appl. No.: 12/736,465

(22) PCT Filed: Apr. 7, 2009

(86) PCT No.: PCT/IB2009/051451
§ 371 (c)(1),
(2), (4) Date: Oct. 8, 2010

(87) PCT Pub. No.: WO2009/125337
PCT Pub. Date: Oct. 15, 2009

(65) Prior Publication Data
US 2011/0027149 A1 Feb. 3, 2011

(30) Foreign Application Priority Data

Apr. 8, 2008 (EP) ................................. 08154213
Apr. 11, 2008 (EP) ................................. 08154368

(51) Int. Cl.
*B01L 3/02* (2006.01)
*F16J 15/32* (2006.01)

(52) U.S. Cl.
CPC ............ *B01L 3/0217* (2013.01); *F16J 15/3232* (2013.01)
USPC ........... 422/501; 422/919; 422/921; 422/923; 422/928; 73/863.32; 73/864; 73/864.01; 73/864.11; 73/864.13; 73/864.16

(58) Field of Classification Search
CPC ....... B01L 3/02; B01L 3/0203; B01L 3/0206; B01L 3/021; B01L 3/0217

USPC ......... 422/501, 509, 516, 521, 919, 921, 923, 422/927–928; 73/863.32, 864, 864.01, 73/864.13, 864.16
See application file for complete search history.

(56) References Cited

U.S. PATENT DOCUMENTS 3,732,735 A * 5/1973 Cohen ......................... 73/864.16
3,831,816 A * 8/1974 Pauliukonis ................... 222/135
(Continued)

FOREIGN PATENT DOCUMENTS

DE    201 09 678 U1    6/2001
GB    2 029 262 A    3/1980
(Continued)

OTHER PUBLICATIONS

Shanks, Robert A., Kong, Ing, General Purpose Elastomers: Structure, Chemistry, Physics and Performance, Advanced Structure Materials, 2013, pp. 11-46, Springer-Verlag, Berlin Heidelberg.

*Primary Examiner* — Brian R Gordon
(74) *Attorney, Agent, or Firm* — Krieg DeVault LLP

(57) ABSTRACT

The present invention relates to a device for manually metering liquids, for example a pipette or a metering button. The device comprises a joint forming a seal between a hollow cylinder and a piston housed inside the cylinder, the piston being moved vertically so as to suck in or expel the liquid. During the metering operation, the joint remains fixed with respect to the movement of the piston and comprises parts formed by portions having dedicated geometric and mechanical characteristics which make it possible to locally optimize the functions of sliding, sealing and fastening in the cylinder.

28 Claims, 18 Drawing Sheets

(56) References Cited

U.S. PATENT DOCUMENTS

| | | | |
|---|---|---|---|
| 3,933,048 A * | 1/1976 | Scordato | 73/864.17 |
| 3,935,734 A * | 2/1976 | Keegan | 73/864.17 |
| 4,046,291 A * | 9/1977 | Goda | 222/309 |
| 4,056,360 A * | 11/1977 | Risch | 73/864.17 |
| 4,061,037 A * | 12/1977 | Keegan | 73/864.17 |
| 4,133,211 A * | 1/1979 | Sarstedt | 73/864.17 |
| 4,141,250 A * | 2/1979 | D'Autry | 73/864.17 |
| 4,304,138 A * | 12/1981 | Tervamaki | 73/864.17 |
| 4,464,941 A * | 8/1984 | Herold et al. | 73/864.13 |
| 5,696,330 A * | 12/1997 | Heinonen | 73/864.13 |
| 5,792,424 A * | 8/1998 | Homberg et al. | 422/515 |
| 6,021,680 A * | 2/2000 | Inagaki et al. | 73/864.17 |
| 6,544,479 B1 * | 4/2003 | Astle | 422/501 |
| 6,645,433 B2 * | 11/2003 | Homberg et al. | 422/522 |
| 6,923,938 B2 * | 8/2005 | Cote et al. | 422/525 |
| 6,926,867 B1 | 8/2005 | Liu et al. | |
| 8,133,453 B2 * | 3/2012 | Molitor | 422/501 |
| 2001/0055547 A1 * | 12/2001 | Rainin et al. | 422/100 |
| 2002/0012613 A1 | 1/2002 | Scordato et al. | |
| 2002/0185821 A1 | 12/2002 | Lehnert et al. | |

FOREIGN PATENT DOCUMENTS

| | | |
|---|---|---|
| WO | 92/16295 | 10/1992 |
| WO | 99/32870 | 7/1999 |
| WO | 2008/076817 A1 | 6/2008 |

* cited by examiner

JOINT FOR DEVICE FOR METERING LIQUIDS

This application claims the benefits under 35 U.S.C. 119 (a)-(d) or (b), or 365(b) of International Application No. PCT/IB2009/051451 filed 7 Apr. 2009, and European Patent Application No. 08154213.6, filed 8 Apr. 2008 and European patent Application No. 08154368.8, filed 11 Apr. 2008.

FIELD OF THE INVENTION

The present invention relates to a device for metering liquids, in particular in a laboratory. It is more particularly related to the metering of liquids in relatively small but accurate quantities, for example of the order of the μl up to 100 ml. More particularly the invention relates to a pipette, a metering device for a bottle or a syringe.

STATE-OF-THE-ART AND PROBLEMS FROM WHICH THE INVENTION ORIGINATES

Document US 2002/0012613 describes, in the introduction thereof, the problems connected with the metering of liquids using a laboratory device, for example a pipette. When working in a research laboratory or during routine measuring in a biomedical or an industrial medium, the user of a pipette may have to execute a very large number of liquid sucking or expelling operations. As pipetting operations are repetitive, they entail tiredness for the user, then contractions and, according to document US 2002/0012613, even physical damages. As exemplary damages the upper limb disorder (ULD), the repetitive strain injury (RSI), musculoskeletal disorders of the hand and the wrist, tendonitis of the flexor and extensor muscles, osteoarthritis of the basal joint of thumb and the carpal tunnel syndrome can be mentioned.

Numerous efforts have been made to reduce tiredness during repetitive metering operations. Document US 2002/0012613 may be cited as an example of an approach relating to the ergonomy of the metering instrument composed of a pipette. Such approach aims at adapting the shape of the pipette to the user's hand, so that it can be held more easily by the hand and can be operated more easily.

Other approaches to reduce tiredness and the associated problems aim at reducing the force required to suck in and to expel the liquid.

Upon the metering with a manual pipette including a disposable nozzle positioned on the lower tip of the pipette, the user first pushes a piston by pressing with his/her thumb on a metering button against the force of a spring which is positioned inside the body of the pipette and plunges the nozzle into the liquid. Then the user slowly releases the pressure exerted on the metering button which returns to its initial position while sucking in the liquid into the disposable nozzle, as it is pushed by the action of the spring.

The liquid is sucked in using the vacuum which is created, when the piston, which is housed inside the pipette and pushed by the metering button, goes up back inside the body of the pipette towards the upper stop position thereof. To create a vacuum, a joint is generally used which forms the sealing between the internal wall of the pipette cylinder and the piston.

The sucking in and the expelling of the liquid using a piston sealingly housed inside the cylinder cause the forces required for metering the liquids. Firstly, the joint is arranged so as to exert a contact force N, normal to the piston or, if it is positioned on the piston, on the internal wall of the cylinder. As a result, the contact force generates a friction force ($F=\mu \cdot N$, with $\mu$ being the friction coefficient and N the normal contact force) created between the joint and the piston, with the friction being the resultant of N required for preserving the sealing. It depends on the mechanic and geometric characteristics of the joint.

One understands that the spring which is used for pushing back the piston to the original upper stop position thereof must be strong enough to overcome the friction exerted by the joint on the piston. The friction force parallel to the surface of the piston and resultant of the contact force necessary for the sealing opposes any movement of the piston. The stronger the spring, the more the user uses his/her force to activate the metering button and thus the more her/she gets tired.

Efforts have been made to reduce the force of the spring so that the metering button can be more easily pushed by a user. However, in order to use a less strong spring, the contact force N and thus the friction exerted by the joint should be reduced, which would consequently increase the risk of a leakage i.e. for example the risk that the vacuum might not be maintained during the suction of the liquid.

In the state of the art, an annular joint made of rubber and/or elastomer, called an O-ring, is often used to provide the sealing between the piston and the wall of the cylinder. Document U.S. Pat. No. 6,926,867 can be mentioned as an example. With an O-ring having a solid section, the resulting friction is relatively high on the plastic material even in the presence of a lubricant. In addition, the joint tolerances are proportionally all the more important since the dimensions are smaller. This results in variable compression rate and contact pressure which are sometimes high to provide the sealing. The reduction in the tolerances on the O-ring and the housing thereof is possible but entails increases in the manufacturing and control costs. Finally, controlling the resulting friction force F is difficult with the O-rings. A minimal constant value can hardly be reached by reducing the contact pressure without increasing the risk of a leakage.

Considering the above, the present invention aims at reducing the friction force exerted by the joint intended to provide the sealing between the piston and the internal wall of the cylinder of the device. The present invention also aims at providing a joint preserving the sealing comparable with the devices of the state of the art while reducing the friction forces.

More generally, the invention aims at reducing the tiredness undergone by the user upon the repetitive metering of liquids.

The invention also aims at implementing a solution which can be provided on devices with different dimensions. More particularly, the present invention aims at implementing a sealing system for small sized metering devices adapted to pistons having a small diameter, by reducing the friction force while preserving a good sealing. In this context, the state of the art often provides joints positioned on the piston. Such joints have the drawback of being difficult to produce and to mount in the device when the piston has a small diameter as is the case with small volume pipettes, for example pipettes for metering volumes of the order 1 to 200 microliters.

The present invention also aims at implementing a solution which can be used not only in the field of manual metering devices, but also in the field of electronic devices. With electronic pipettes, for example, a reduced friction force would make it possible to use a motor with a lower power and thus a more economical one, and thus to increase the autonomy of batteries as well as the total number of pipetting operations. The present invention also aims at implementing a solution which can be used with mono-channel pipettes or advantageously multi-channel pipettes to reduce the total resultant activation force.

SUMMARY OF THE INVENTION

The present invention relates to a device comprising a cylinder and a piston housed inside the cylinder for manually metering liquids, the device being so arranged that, upon metering operations, the piston moves along its axis to suck in or to expel the liquid, with the device further comprising a joint housed in the cylinder and arranged so as to provide a sealing between the cylinder and the piston.

According to a preferred embodiment of the device according to the invention, upon metering operations, the joint remains fixed with respect to the movement of the piston and includes at least two parts formed of material parts specifically shaped to locally optimize the functions of sliding and sealing on the piston as well as a sealing fastening against the cylinder.

According to one embodiment of the device according to the invention, the joint comprises a first part which cooperates with the internal wall of the cylinder and provides the functions of sealing against the internal surface of the cylinder and fastening to the latter, and a second part which is in contact with the piston and which provides the sealing functions between the joint and the piston and the sliding functions between the latest two pieces. These two parts, which fulfill different functions, have different shapes and/or dimensions.

According to another aspect, the invention relates to the manual metering of liquids which comprises a cylinder, a piston sliding in the cylinder against and under the effect of the force of a spring, and a joint housed between an internal wall of the cylinder and an external wall of the piston, characterized in that the joint is an annular part conformed with distinct respectively peripheral and internal annular parts.

The peripheral part is preferably arranged for a stationary fastening to said internal wall of the cylinder and said internal part is arranged for a continuous and sealed sliding against the external wall of the piston, with the latter being cylindrical.

DETAILED DESCRIPTION OF THE VARIOUS EMBODIMENTS OF THE INVENTION

Figure 1:
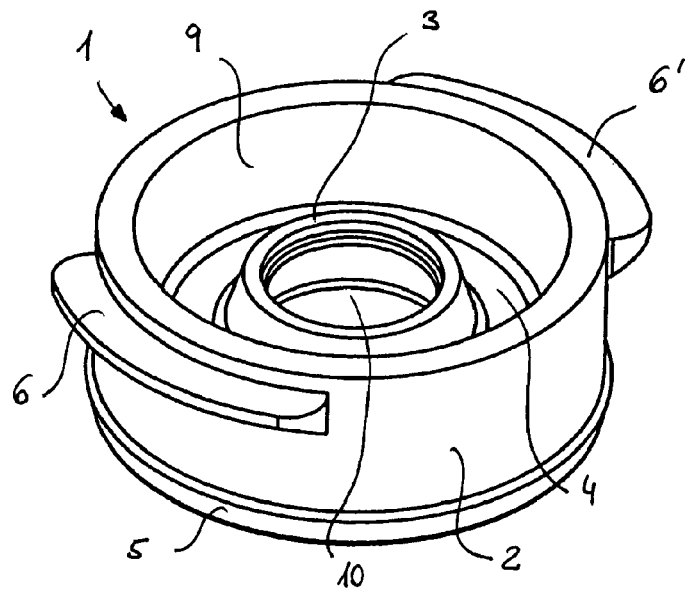
FIG. 1 shows a joint for the metering device according to a first embodiment of the invention, with the joint being shown in perspective.

The following description is given as a non-limitative illustration and refers to the appended drawings which show examples of several implementations of the metering device according to the invention.

In the context of such description, the location indications such as "high", "low", "upper", "lower", "external", "internal", "horizontal" and "vertical" should be understood directly with respect to the drawing such as shown in a made-up Figure. In the Figures, the objects are shown with their natural orientation i.e. with the orientation they have if the metering device which they belong to is held in a position of utilization. For example, a mono-channel pipette comprising a main axis is oriented so that such axis is vertical. This is also the case with a metering device for a bottle positioned on a bottle, or a manual pipette in the pipette holder thereof.

Figure 2:
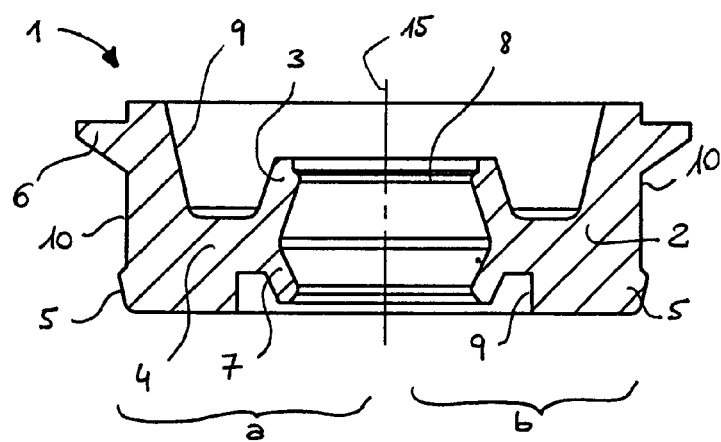
FIG. 2 shows the joint in FIG. 1 in an axial cross-section.
Figure 3:
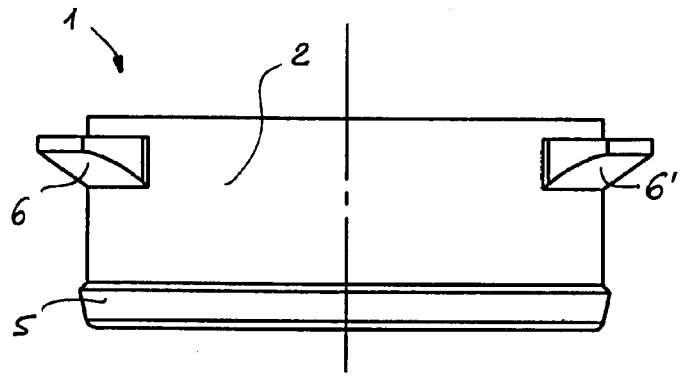
FIG. 3 shows a top view of the joint in FIG. 1.

FIGS. 1 to 3 show a joint provided for a pipette according to a first embodiment of the device of the invention, with such joint being shown respectively in perspective, in an axial cross-section and as a top view in FIGS. 1, 2, and 3. The joint 1 includes several parts 2, 3, 4, 5, 6, 7 having different shapes and each fulfilling a specific function, as explained hereinafter.

The part 2, the more voluminous one, forms an annular body which is rigid and which has a profile constant on its contour. It acts as a support for the other parts and enables the fixed anchoring of the joint 1 inside the cylinder of a pipette. Downwards and on the outside of the contour thereof, it includes a slightly enlarged rim 5 intended to create a sealing contact with the internal wall of the cylinder of the pipette, as is described with respect to the second implementation. Two diametrically opposed protruding fins, 6 and 6' protrudingly extend from the cylindrical external surface of the body 2 of the joint 1 toward the upper edge thereof. Such fins cooperate in anchoring the joint in the cylinder of the pipette.

Parts 3, 4, 7 are surrounded by the body 2. The part 4 includes a horizontal annular connection between the inner edge 9 of the body 2 and two lips 3 and 7 having a reduced thickness, intended to slide in contact with the external cylindrical face of a piston forming the active element of the pipette. The upper lip 3 is sloping upwards whereas the lower lip 7 is sloping downwards.

The extreme edges of both annular lips 3 and 7 define the dimension of an opening 8 at the center of the joint 1, with such opening having a circular shape when seen from above. One understands that the joint 1 in FIGS. 1 to 3 is intended to be housed and engaged inside the cylinder and that the piston going through the joint will also be housed in the cylinder of a pipette. The profile of the joint, in diametrical section according to FIG. 2, has an axis of symmetry 15 which coincides with the axis of symmetry of the pipette and includes two symmetrical halves a and b, each with a massive zone 2,5 fixed to the cylinder and a flexible zone 4, 3, 7 shaped to have a sliding contact with the external face of the piston of the pipette. It is important that the contact between the lip 3, 7 and the piston is sealed but with a resistance to friction as low as possible, whereas the body 2 must be rigidly fixed to the cylinder. As regards the material of the joint 1, an appropriate elastomer will preferably be chosen, which enables a precise molded shaping.

The different functions dedicated to the various parts of the joints explain the asymmetrical shape of each one of the parts a and b, on either side of the axis of symmetry, and distinguishes the device according to the invention from the joints for pipettes of the O-ring or X-ring type of the state of the art.

Reference is now made to FIGS. 4 to 10 which show a metering device according to a second implementation of the invention.

Figure 4:
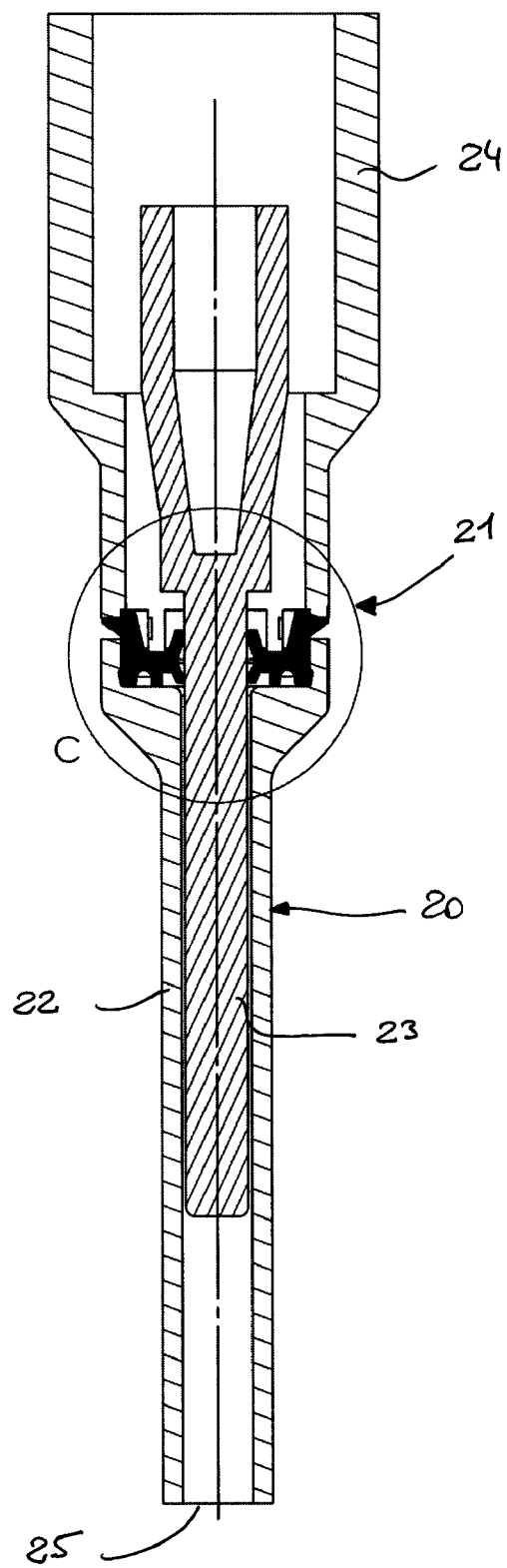
FIG. 4 shows, in axial cross-section, a cylinder, a piston, and a joint of a device according to the invention.

FIG. 4 shows an axial cross-section of the elements in a pipette intended to be manually activated. Such a pipette includes a piston 23 which is housed so as to be able to slide in a cylinder 20 composed of a lower part 22 separated by a by a joint 21 from a upper part 24. The joint 21 creates the sealing between the lower part 22 and an upper part 24 and the cylinder 20, so that the pipette is functional. Whereas. FIG. 4 shows the piston 23 in one piece, as it is obtained for example with a molding process, the cylinder 20 can be made of two different parts, 22, 24, liable to be connected with a thread. The free space at the basis of the cylinder 20 enables the suction of the liquid when the piston 23 goes up in the cylinder, on the basis of which a nozzle is fixed and plunged in the liquid. The suction effort is maintained thanks to the sealing provided by the joint 21, as explained at the beginning of the present document.

Figure 5:
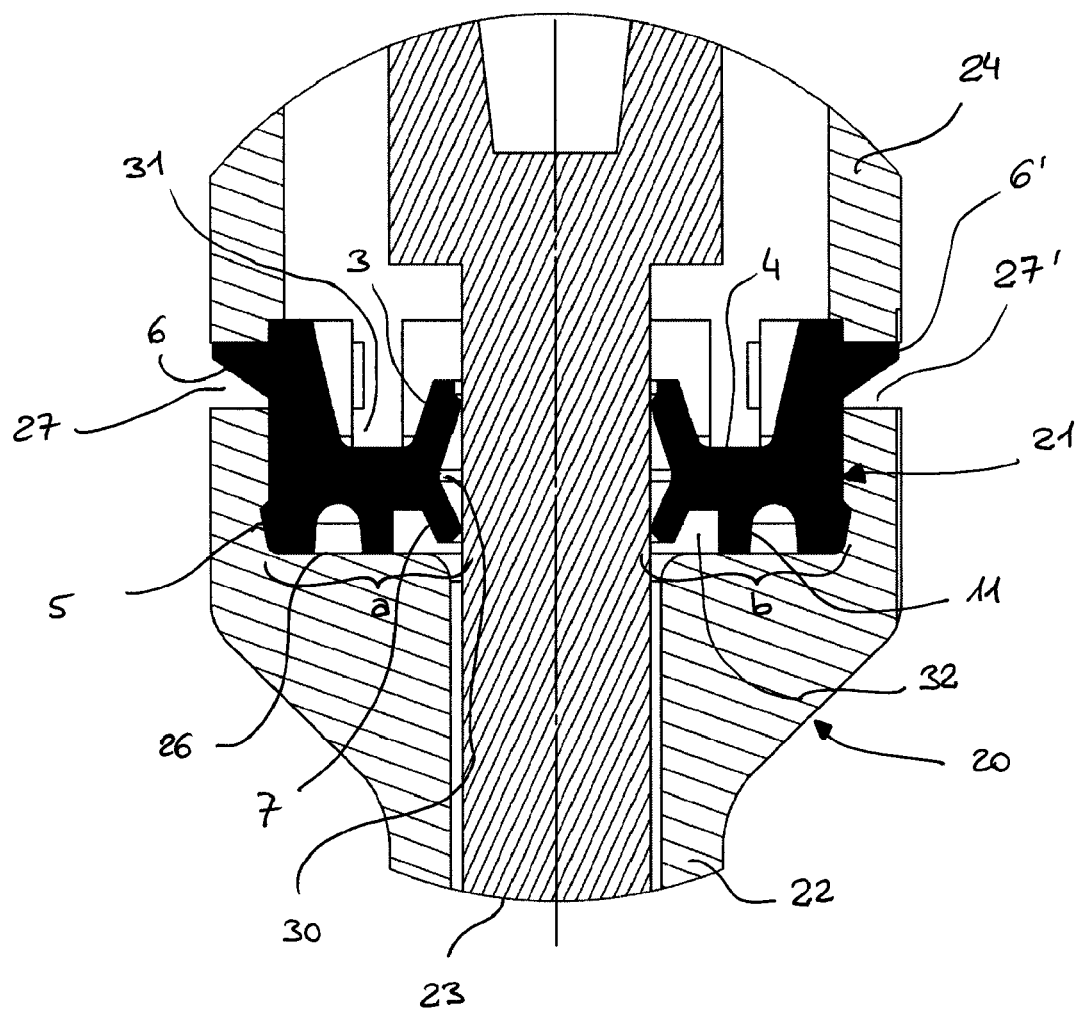
FIG. 5 is an enlarged view of detail C in FIG. 4.

FIG. 5 shows, as an enlarged and axial cross-section similar to FIG. 4, the position of the joint 21 between the two upper and lower parts 22 and 24 of the cylinder 20. The joint 21 is housed inside the cylinder 20 exactly at the passage between the lower 22 and upper 24 parts. If both parts are made of two separate parts, the joint can be housed in the lower part 22 or in the upper part 24, the condition for this last possibility being that the connection (possibly by thread) between both parts 22 and 24 is also sealed.

In FIG. 5, the extract indicated with letter C in FIG. 4 illustrates the housing of the joint 21 in the cylinder 20. The axial cross-sectional view shows, as in FIG. 2, the profiles of both symmetrical sections (a) and (b) of the annular joint and a certain similarity can thus be seen between the joint 1 in FIGS. 1-3, the matching parts having the same reference signs. The joint 21 in FIGS. 4 and 5 thus includes the body 2, the plane connection 4, and the circular lips 3 and 7, wherein the smooth cylindrical face of the piston 23 slides by deforming these elastically. The plane annular part 4 is provided with a cylindrical rib 11 extending in the lower part of the body 2 of the joint, unlike FIGS. 1 to 3. It provides recesses and improves the functional separation between the fastening of the joint to the cylinder 20 and the flexible sealing zone against the piston 23.

A recess (or an air pocket) is a notch and/or a bulge which creates zones with a reduced thickness, with such zones defining the transitions between the various parts, more particularly between the parts fulfilling different functions.

The lower part 22 of the cylinder 20 shows, at the upper end thereof, a flat bottom housing 26 which receives the joint 21 and prevents any vertical movement of the latter towards the bottom of the cylinder 20. A vertical movement upwards is mainly prevented by the fins 6, 6' having the shape of ring sections protruding from the body 2. Such fins are engaged in the openings 27,27' which go through the wall of the cylinder 20. The body 2 is rigid enough to prevent the movement of the joint 21 when a force oriented vertically upwards is applied thereon.

In order to improve the sealing between the joint 21 and the internal wall of the cylinder 20, the rim 5 of the joint defining a perimeter which is slightly greater than that of the body 2 exerts a pressure on the internal wall of the cylinder 20. The force creating such a pressure may be relatively high because no relative movement between the joint and the cylinder is provided upon the operation of the metering device. According to the invention, and thanks to the shape of the joint, the force exerted thereby on the internal wall of the cylinder 20 is uncoupled of the contact force exerted by the same joint on the piston 23. The latter is much smaller.

FIG. 5 also shows that the lips 3 and 7 surround the piston 23 and thus create a sealing contact with the piston. Thanks to the reduced thickness of the lips 3 and 7 with respect to the rigid part 2 of the joint, and thanks to the orientation of the lips, which includes a vertical part, humans skilled in the art will appreciate that the pressure exerted on the piston is smaller than, and even substantially smaller than the pressure and the force exerted by the joint 21 on the internal wall of the cylinder 20. The humans skilled in the art will more particularly note that, compared with an O-ring, the joint 21 includes several recesses 31, 32, which uncouple the various parts thereof and thus make it possible to obtain the advantages of the invention. In particular, it is possible to reduce the frictional force exerted by the joint on the piston 23.

The lips 3 and 7 of the joint shown in FIG. 5 form a closed space 30, which can be used as a tank for a lubricant. Using a lubricant at this place makes it possible to reduce the friction force on starting up by breaking the adhesion between the joint 21 and the piston 23 further to an extended period of rest, during which the device would not have been used. The flexibility of the lips at the zones of contact with the piston causes micro-deformations which also make it possible to quickly create the lubricating intermediate film.

Figure 6:
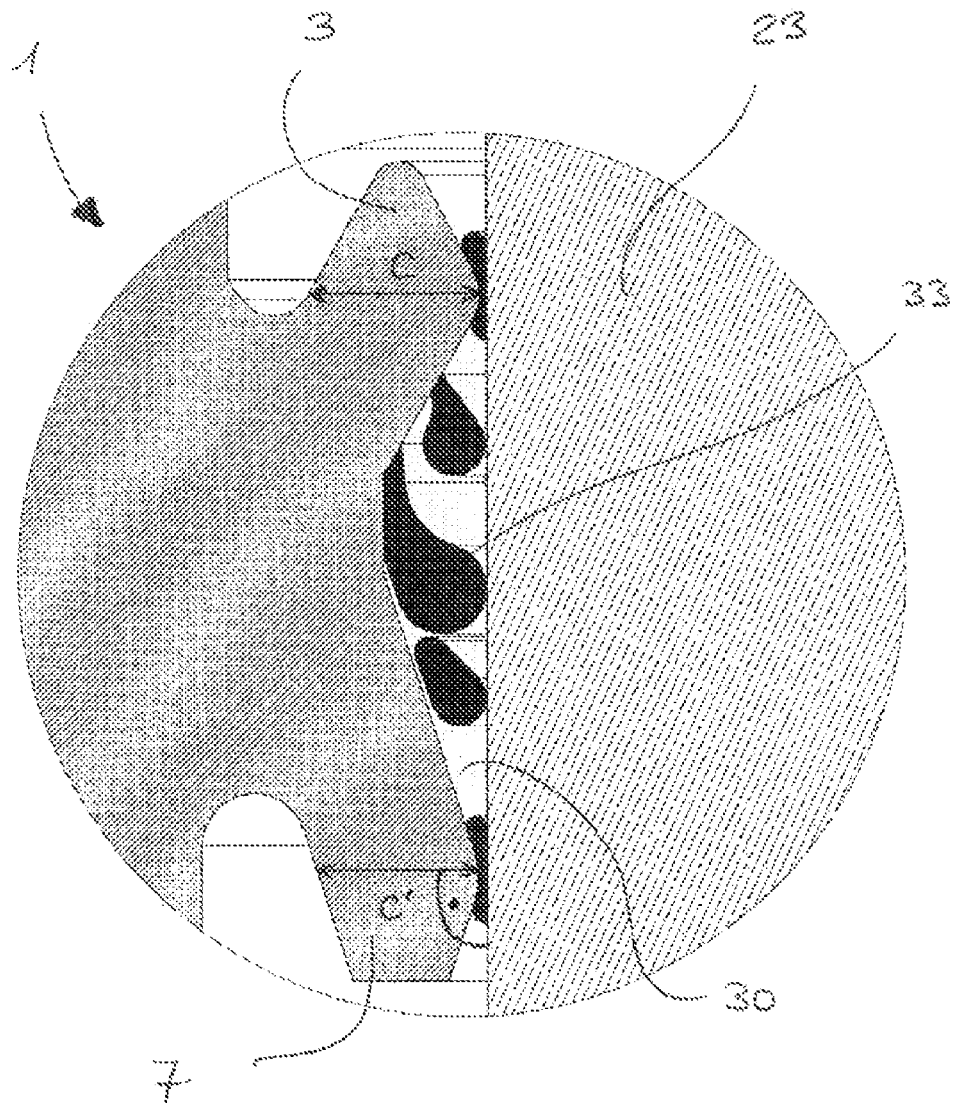
FIG. 6 schematically shows an enlarged and axial cross-sectional view of the detail of the joint shown in FIGS. 4 and 5.

The closed space 30 is shown on a larger scale in FIG. 6, wherein the presence of a lubricant 33 is visible. The lubricant 33 can particularly be found in the contact zone between one lip 3 and 7 of the joint 21 and the piston 23. The lubricating film prevents/postpones the creation of adhesion forces and reduces the friction between the joint and the piston 23, which entails that the force required to move the piston 23 in a vertical direction is comparatively smaller.

While referring to FIG. 6, we mentioned the thickness c, c' of the lips 3 and 7 of the joint 21. Each one of such thicknesses is measured at a contact point between the lip and the piston in a direction perpendicular to the piston axis. Such thickness (or distance) is small when compared to the dimensions of the joint or body 2 of the joint (visible in FIGS. 1, 2, 5). According to one embodiment of the joint according to the invention, the distance c (and/or c') is less than 1 mm, preferably less than 0.7 mm, less than 0.5 mm and/or even than 0.5 mm. Such thickness is preferably applied to the whole or to the main part of the surface of the contact zone between the joint and the piston. The uncoupling of the various parts of the joint, as mentioned in detail hereabove, allows such a small "contact thickness" between the joint and the piston 23 and also makes it possible to reduce the contact force and the friction force imparted by the sealing contact between the joint 21 and the piston 23. Consequently, the spring forces required for pipetting can be reduced and the repeated handling of the metering device according to the invention becomes less tiring, the risk of contraction, muscle stresses, tendonitis and/or muscular pains are generally reduced.

Figure 12:
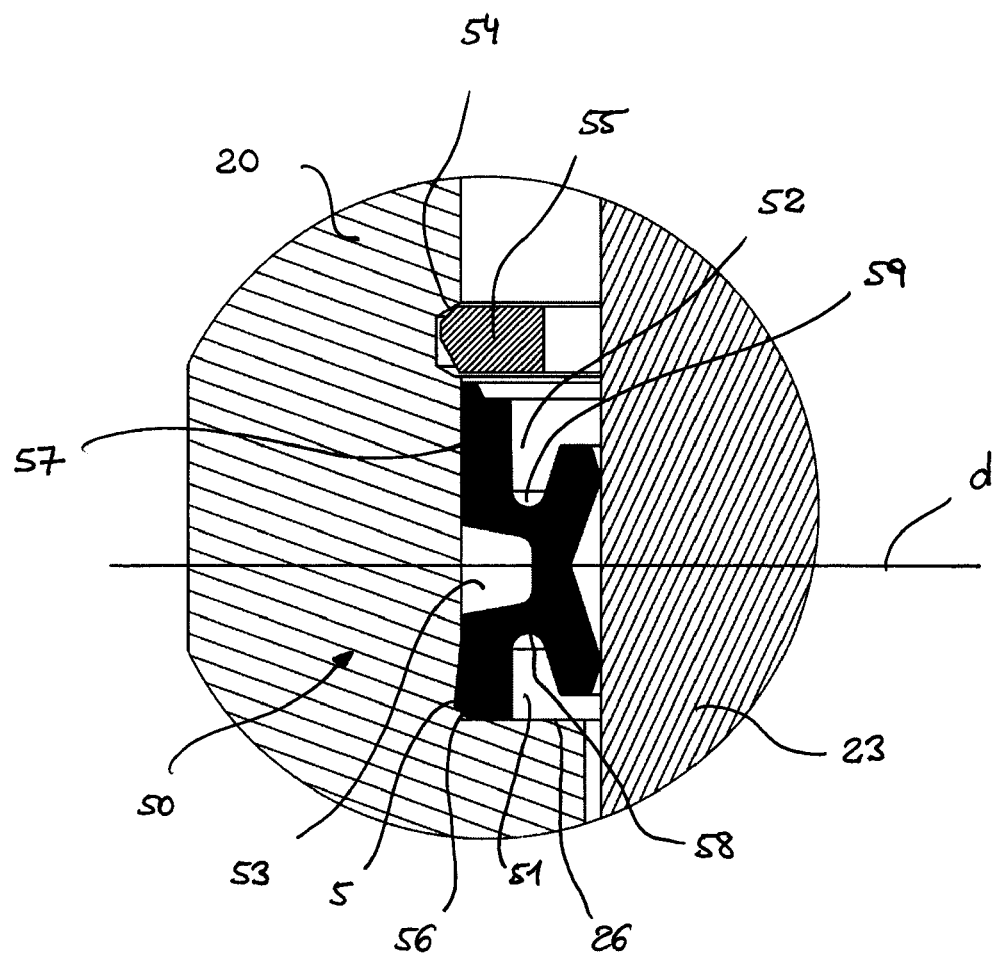
FIG. 12 is an enlarged view of detail C of the device shown in FIG. 11.

According to one embodiment, a connection zone between the part fulfilling the function of anchoring the joint in the seat thereof and/or sealing against the wall of the cylinder and the part fulfilling the function of sealing the piston, which includes a reduced thickness as mentioned above. In this case, the lip does not necessarily provide the uncoupling function itself, but the structure which connects the parts fulfilling the various functions. If we consider the example of the joint 1 as illustrated in FIG. 2, this can be the annular connection 4 which is characterized by a thickness such as defined with respect to the letters c and/or c' above. It should be noted that in this case, the measured thickness is the minimum thickness between two parts, more particularly between the anchoring and the sealing part against the cylinder (for example, the part 2 in FIG. 2) and the sealing part against the piston (for example the lips 3 and 7 in FIG. 2 or 5). An example with a small thickness connection is shown in FIG. 12, where connections 58 and 59 are thinner than the lips providing the contact with the piston. In FIG. 12, the thickness of the connection between the functions is reduced thanks to a recess 53.

The embodiments illustrated in the following Figures also make it possible to take advantage of the above-mentioned advantages, which will thus not be systematically repeated.

Figure 7:
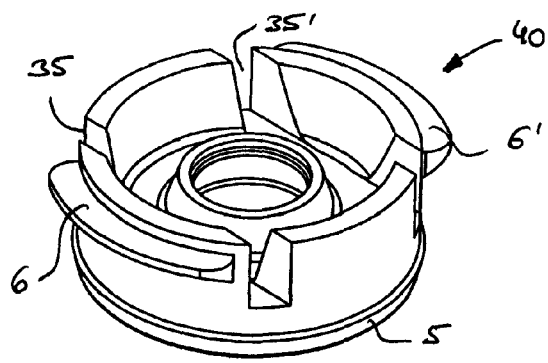
FIG. 7 is a perspective view of the joint according to a second embodiment of the invention.
Figure 8:
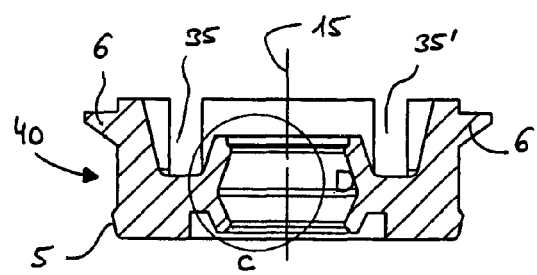
FIG. 8 is an axial cross-sectional view of the joint in FIG. 7.
Figure 9:
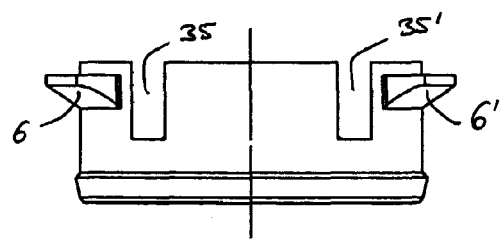
FIG. 9 is a top view of the joint in FIG. 7.
Figure 10:
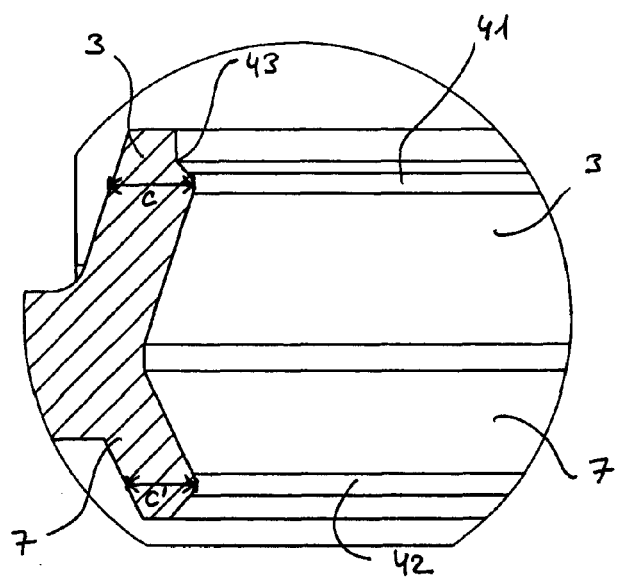
FIG. 10 is an enlarged view of the detail C in FIG. 8

FIGS. 7 to 9 show in perspective, in an axial cross-section and in a top view as well as an enlarged partial cross-section in FIG. 10, a joint 40 which is different from the joint 1 shown in FIGS. 1 to 3, in that it further includes two cross-sectional and parallel cuts 35, 35' which go through the joint in vertical directions from the top down to approximately the middle of the joint 40, stopping at the level of the internal connection 4 between the body 2 and the lips 3 and 7. The cuts 35, 35' affect the upper parts of the massive body 2 and are provided so as to cut four recesses in the wall of the body 2, out of but close to the ends of the fins 6, 6'. The cuts 35, 35' are vertical slots which are positioned at equal distances from the central axis of symmetry 15 of the joint 40.

The four recesses created by the cuts 35, 35' facilitate the insertion of the joint 1 into the housing thereof, by providing the shifting of the fins 6, 6' and the upper part of the body 2 associated towards the inside of the joint. That way, the fins 6, 6' facilitate the insertion of the joint into the housing thereof inside the cylinder 20. As a matter of fact, the joint must be inserted through an upper opening in the cylinder 20 and through a passage having an internal diameter which is almost identical with the diameter of the joint 40, more particularly the diameter defined by the upper edge of the body 2. As the cuts 35, 35' do not go further in the direction of the bottom of the joint 40 than the internal plane connection 4 and do not reach the level of the rim 5, the cuts 35, 35' do not interfere with the sealing function against the internal wall of the cylinder 20. The part of the joint 40 which is higher than the internal connection 4 then fulfils, in addition to the function of anchoring the joint in the housing thereof using the fins 6, 6', a function of flexibility facilitating the insertion of the joint during the assembling of the pipette.

FIG. 10 is an enlarged partial cross-sectional view of FIG. 8 and appears in the latter in a circle. The characteristics shown in FIG. 10 are also present on the joint 1 in FIGS. 1-3, but are not mentioned in these Figures because of the small size of such characteristics.

FIG. 10 shows a contact zone 41, formed by a part of the upper lip 3, the surface of which is not very high and has the shape of a hollow cylinder. It should be noted that the small height of such contact surface 41 means that the whole contact surface is reduced. The humans skilled in the art would more particularly note that the reduction in the contact surface between the joint 40 and the piston 23 is equivalent to a reduction in the friction force by adhesion when at rest, and during a relative movement between such two elements. FIG. 10 also shows more particularly a segment having an asymmetrical profile 43 of the lip 3, curved so as to both determine and minimize the contact surface 41.

FIG. 10 also shows a contact zone 42 of the lower lip 7 with the piston 23 (not shown). The profile of the lip 7 does not have the asymmetric concave shape 43 of the upper lip 3, but the contact zone 42 is however clearly defined and limited with respect to the remainder of the lip 7.

Figure 11:
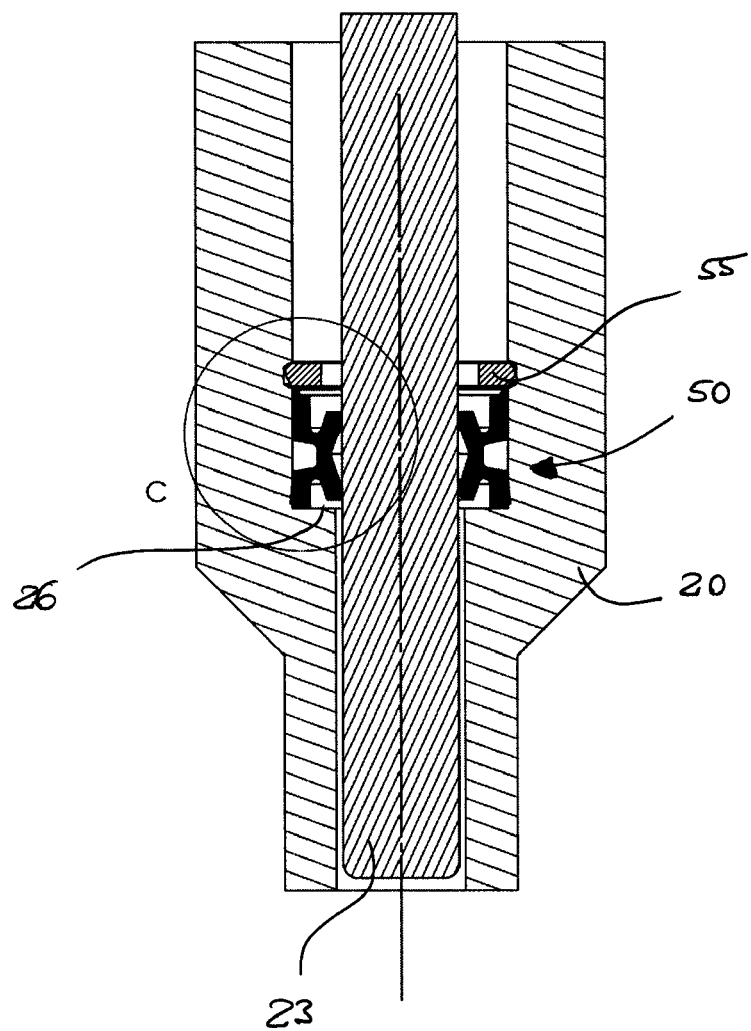
FIG. 11 is a partial axial cross-sectional view of a third embodiment of the device of the invention.

FIGS. 11 and 12 show a general axial cross-section and a partial enlarged axial cross-section of ones embodiment of the invention comprising a joint 50. The joint 50 is simpler than the joints 1, 40 mentioned above, but also includes two lips which are in contact with the piston 23. If the profile of the joint is considered (FIG. 12) in an axial cross-section limited to one-half of the assembly with respect to the axis of the piston, it appears that the joint 50 is less asymmetrical than the preceding joints 1, 40. It clearly appears that the joint 50 in fact has a plane of symmetry perpendicular to the axis of the pipette which in the plane of FIG. 12 is reduced to a particular axis of symmetry d with the profile shown in this Figure. Outside and in contact with the cylinder 20 of the pipette, the joint 50 includes two body segments 56 and 57. Both segments are not symmetrical with respect to the axis d because of the presence of the rim 5 on the body segment 53 and of a slightly sloping structure on the opposite body segment 57. The external cylindrical face of the body segments 56 and 57 is in contact with the cylinder 20. Inside, i.e. in contact with the piston 23, the joint has two lips equally symmetric with respect to the axis d. Between the support elements 56 and 57 extends a recess 53 which defines 2 junctions or flexible connections 58 and 59. If the small differences existing in the parts 56 and 57 which are responsible for the anchoring of the joint in the housing thereof, are ignored, only one axis of symmetry d is identified.

The hollow support 2, present in the joints 1 and 40, is transformed into two parts of support 56 and 57, one being arranged vertically above the other and separated by a recess 53. Such recess 53 creates two junctions 58, 59 which are approximately horizontal and which join the parts of the support 56 and 57 with the lips. The fineness of the junctions 58, 59 determines the mechanical uncoupling between the rigidity of the support parts 56 and 57 with a relatively large volume and the flexible lips.

At this stage, it should be mentioned that the joint 1, 40 and 50 are composed in one part and manufactured in only one material, generally an elastomer. The different rigidity and/or flexibility of the various parts of the joints result from the various thicknesses of these parts or from the volume occupied by the material by and in such parts.

Embodiments shall be mentioned further down in which the differences in rigidity making it possible to fulfill different functions are obtained by different materials placed in different parts of the same joint.

Upwards, the joint 50 is retained in the housing thereof using a holding ring 55 which is placed in a notch 54 of the pipette body 20. Upon assembling the metering device, the joint 50 is inserted through an upper opening in the cylinder 20 and engaged up to the lower rim 26. Then, the holding ring 55 is inserted and stopped at the notch 54. In this way, the supporting elements 56 and 57, which are relatively rigid, provide the fixed and stationary positioning of the joint 50 inside the seating thereof in the cylinder 20.

Figure 13:
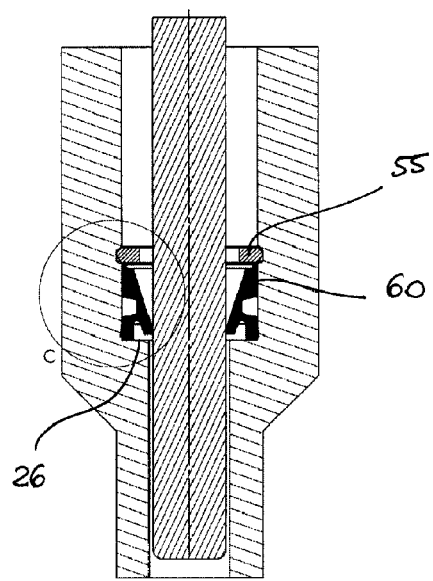
FIG. 13 is an axial cross-sectional view of a fourth embodiment of the device of the invention.
Figure 14:
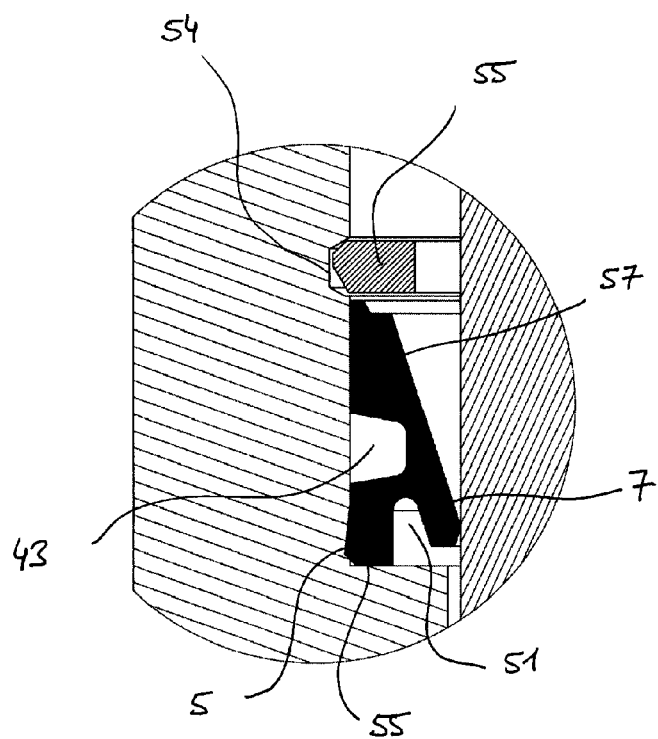
FIG. 14 is an enlarged view of detail C of the device in FIG. 13.

FIGS. 13 and 14 also show respectively in a general axial cross-section and an enlarged partial cross-section an embodiment of the invention including a joint 60 with only one lip 7 provided as the lower lip of the preceding embodiments (the joints 1, 40 and 50). The general structure of such joint 60 has several parts in common with the embodiment shown in FIGS. 11 and 12 and the matching parts are mentioned with the same reference numbers.

Contrary to the notes above with respect to the symmetry of the joint shown in FIGS. 11 and 12, the semi-section of joint 60 shown in FIG. 14 has no axis of symmetry. The single lip 7 has a smaller sealing function upon the return of the piston (suction=partial vacuum, extended air cushion ΔP−), whereas upon the metering operation (the piston moved downwards), it tends to be reinforced by the creation of an overpressure ΔP+ providing a complete expulsion.

According to an alternative embodiment of the invention (not shown in the drawings), the joint includes only one lip similar to the situation shown in FIGS. 13 and 14, with the difference that the single lip is turned upwards and matches an upper lip of one of the embodiments described above. Such embodiment also has advantages since the single lip turned upwards has a significant sealing function upon the return of the piston which is important. Upon the suction of the liquid, the reduction in the friction obtained by eliminating the upper lip is an advantage.

It is clear that in a two-lip joint, with an upper lip and a lower lip, as shown in FIGS. 1-12, both advantages mentioned in detail above are obtained.

Figure 15:
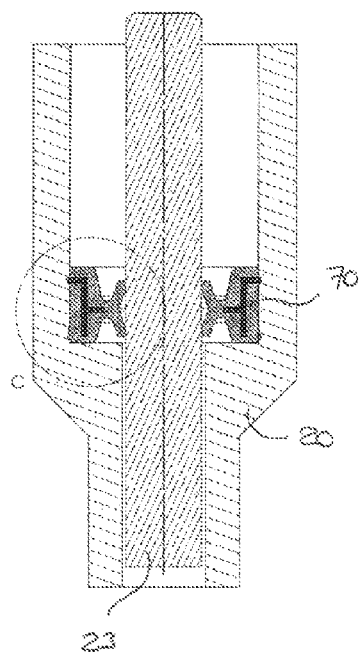
FIG. 15 is an axial cross-sectional view of a fourth embodiment of the device of the invention.
Figure 16:
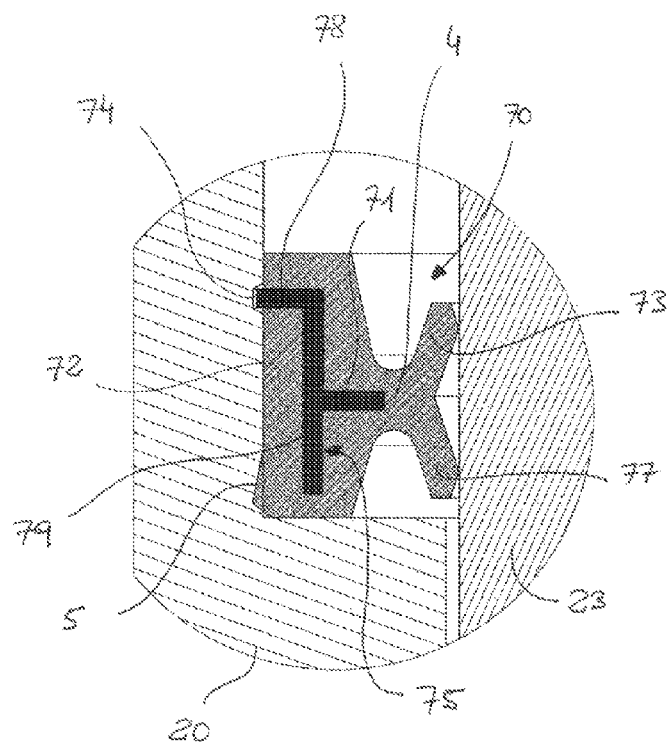
FIG. 16 is an enlarged view of detail C of the device in FIG. 15.

FIGS. 15 and 16 show an embodiment according to the invention including a joint 70, the supporting part of which 72 has the shape of a hollow cylinder and includes and surrounds the greatest part of the stabilizing element 78, which is rigid and made up of a different material and thus is more rigid than the remainder of the joint 70, for example a metal core. The latter is thus composed of 2 different materials. The more rigid material 78 buried in the parts of the joint 70 which plays the part of a support for the assembly of elements, provides the anchoring and the stable positioning thereof in the housing.

The lower lip 77 and the upper lip 73 of the joint 70 are symmetrical (FIG. 16: half section of an axial cross-section). On the contrary the external part of the half section 72 is massive and has a sealing rim 5 which is operated as mentioned above and contains the stabilizing element 78 having a unsymmetrical form. Such element includes several parts, which in the radial cross-sectional view of FIG. 16, are shown as the arms 79, 71, 78, but compose a short tubular element 79 considering the three-dimensional shape of such element 75, and two extensions having the shape of flat rings 71, 78 with different diameters, respectively connected to the center and to the upper end of the tube 79, and directed one inwards and one outwards of the cylinder. The external ring 78 goes through the body made of a less rigid material of the joint 70 to engage into a groove 74 in the internal wall of the cylinder 20, in order to further anchor the joint 70 in the hollow cylinder 20. In this way, the upper extension 78 is operated similarly to the holding washer 55 in FIG. 12. In the embodiment according to FIGS. 15 and 16, this "holding washer 55" composed of the extension 78 is integral with the joint 70. In this way, using an element 78 made of a second material more rigid than the basic material wherein the lips are formed, thus makes possible (a) to obtain a more rigid supporting function provided by the supporting cylinder 72 and (b) at least partially the anchoring the joint 70 inside the cylinder using the interaction between the elements 78 of the joint and 74 of the cylinder 20 wall.

In other words, contrary to the joints of the state of the art, the present invention also relates to joints manufactured in one piece in several materials having different rigidity. The different rigidity enables the main formation of the parts of the joint reinforcing the anchoring thereof in the cylinder, for example through the interaction thereof with stops, such as a groove or openings existing in the cylinder 20.

Figure 17:
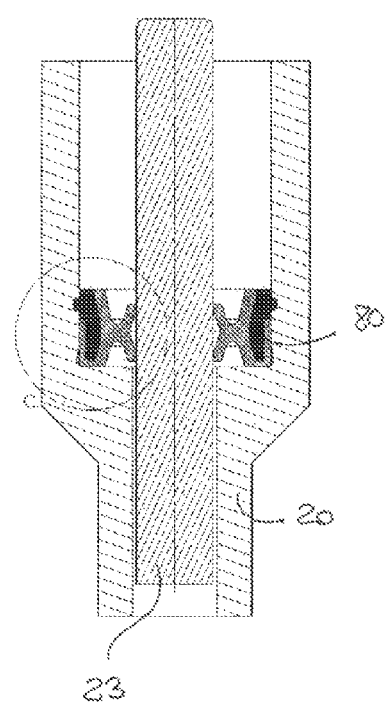
FIG. 17 is an axial cross-sectional view of a fifth embodiment of the device of the invention.
Figure 18:
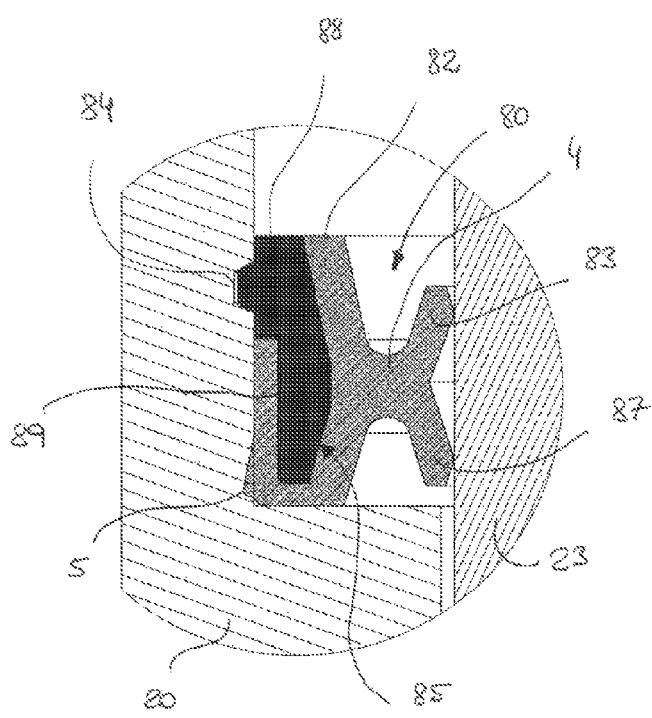
FIG. 18 is an enlarged view of detail C of the device in FIG. 17.

FIGS. 17 and 18 show another embodiment of the object of invention, according to which, as per the embodiment shown in FIGS. 15 and 16, the joint 80 is made of one piece but includes parts made of different materials. Like in FIGS. 15 and 16, one of the materials is more rigid than the other. In FIGS. 17 and 18, the tube 85 which is surrounded by or mainly buried, and supports an elastic material providing the sealing functions against the piston 23 in the cylinder 20.

As can be seen in FIG. 18, the rigid element 85 exhibits an upper bulge 88, which overlaps the less rigid material which the lips 83 and 87 are made of, as well as other parts of the joint characterized by their flexibility. Such upper bulge 85 is formed so as to be able to engage into a groove 84 of the cylinder 20 wall, so as to block or stop the joint in the cylinder.

The joints shown in FIGS. 15 and 16 or 17 and 18 can be manufactured for example by overmolding, bi-injection or any other composite process. As an alternative, both elements can be manufactured separately, and the less rigid part can be engaged on the rigid parts for example. Of course other possible manufacturing exists and can be chosen by humans skilled in the art.

Figure 19:
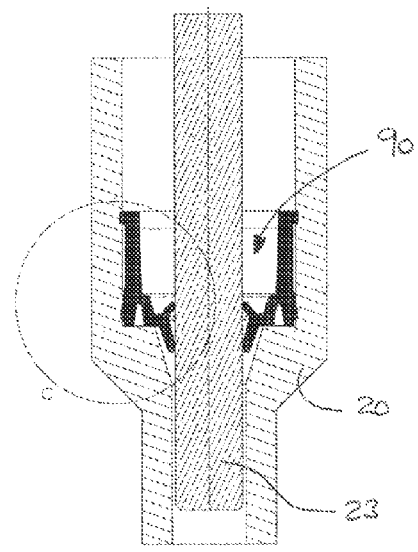
FIG. 19 is an axial cross-sectional view of a sixth embodiment of the device of the invention.
Figure 20:
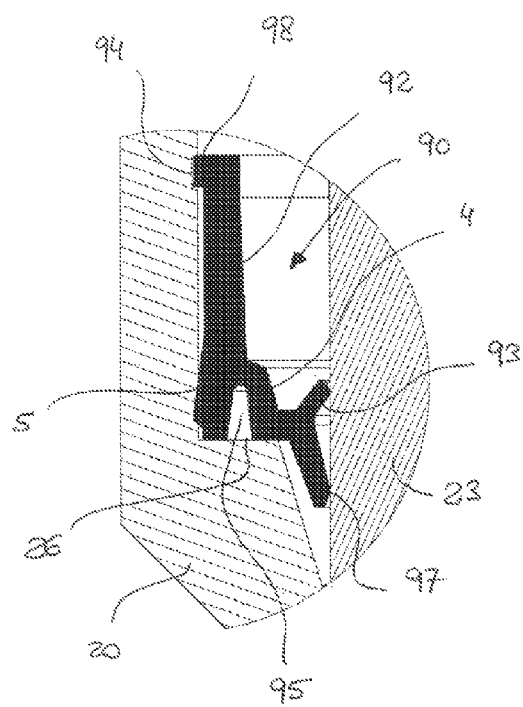
FIG. 20 is an enlarged view of detail C of the device of FIG. 19.

FIGS. 19 and 20 show an other embodiment of the present invention. The joint 90 includes a tubular supporting part 92 having a longer shape than the previous embodiments. The connection element 4 starts from a region close to the basis of the supporting tube 92 and opens onto both lips 93 and 97, which in the embodiment shown in FIGS. 19 and 20 have different shapes, with the lower lip 97 being a bit longer than the lip 93.

In FIGS. 19 and 20, the supporting tube 92 is thinner than in the previous embodiments. This type of embodiment makes it possible to fix the elements in the cylinder wall without any openings. It is advantageous for example, for small sized joints positioned in "deep" seats of cylinder, for example for multi-channel pipettes. Because of unmolding constraints, a groove for the fastening in the upper part close to the inlet of the cylinder is privileged. The stability and the support function are provided partly by the length of the tubular part 92, the peripheral contact zones in 5 and 94 are compressed. The same principle applies to the embodiment shown in FIGS. 21-22, described above.

Towards its upper end, the supporting cylinder 92 includes an external rim 98, which cooperates with the groove 94 in the cylinder so as to reinforce the anchoring of the joint 90 in the cylinder 20 of the metering device.

The embodiment according to FIGS. 19 and 20 is further characterized in that the connection zone 4 having the shape of an internal flange starts from the supporting tube 92, then first curves down and contacts the internal rim 26 of the cylinder 20. Then the flange 4 is parted into two lips 93 and 97, as described above. Then a recess 95 is formed between the flange 4 and the lower end of the supporting tube 92, thus ideally separating the supporting and sealing functions relative to the wall of the cylinder 20 from the sealing function on the edge 5 with the piston 23.

Figures 21, 22:
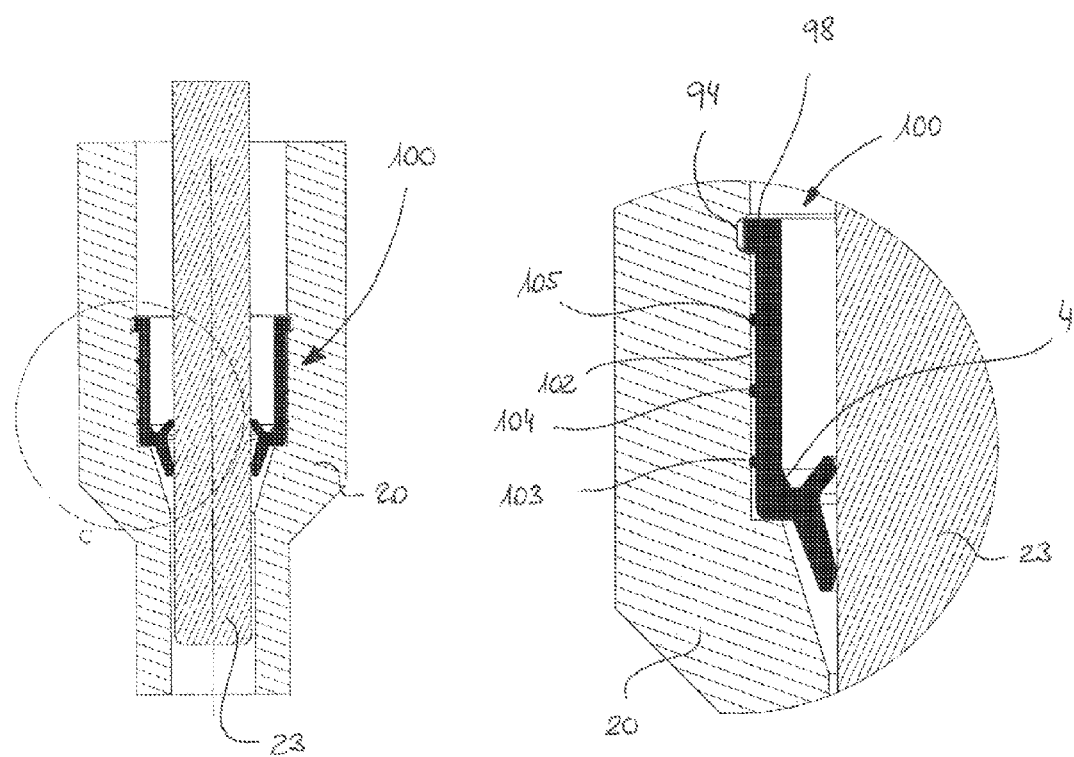
FIG. 21 is an axial cross-sectional view of a seventh embodiment of the device of the invention.
FIG. 22 is an enlarged view of detail C of the device in FIG. 21.

FIGS. 21 and 22 show one embodiment with a joint 100 similar to that of FIGS. 19 and 20 but different therefrom in that the internal flange 4 of the joint 100 leaves from the lower end of the supporting tube 102. In addition, the joint 100 includes a plurality of sealing ribs 103, 104 and 105 on the external surface of the supporting tube 102. Such compression sealing ribs replace the enlarged rim 5 of the previous embodiments and secure the sealing function against the internal wall of the cylinder 20.

Figure 23:
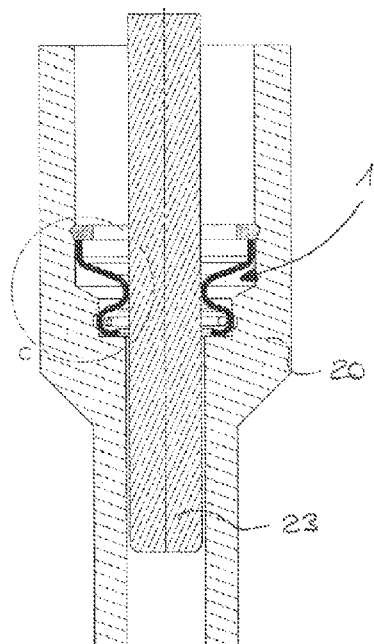
FIG. 23 is an axial cross-sectional view of a first embodiment of a second implementation of the device of the invention.
Figure 24:
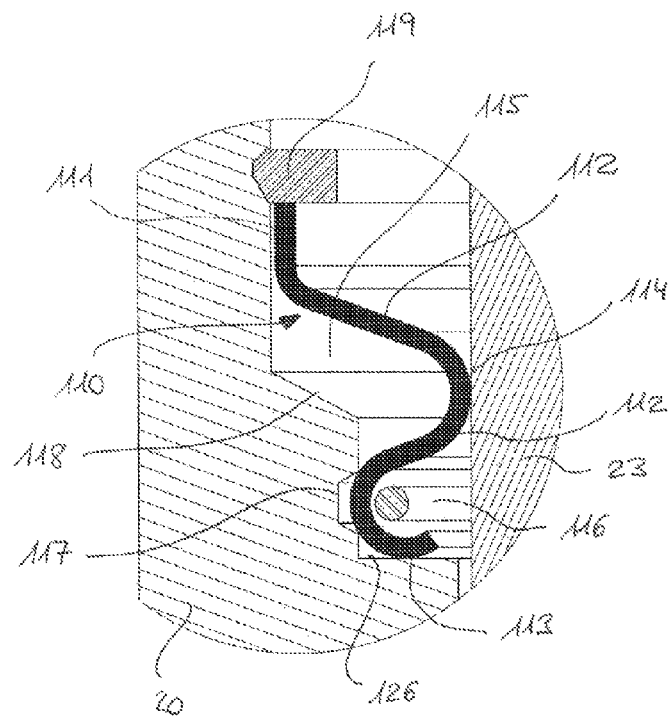
FIG. 24 is an enlarged view of detail C of the device in FIG. 23.

FIGS. 23 and 24, as well as the following Figures, relate to embodiments which vary from the preceding embodiments in that the lips such as lips 93 and 97, for example, are absent. The sealing function against the piston 23 is provided by a part which, according to the half-profile shown in FIG. 24, for example, is the shape of a curved line 112, 114 oriented towards the axis of the piston and the crowned proximal zone 114 which is in contact with the piston. As seen in three dimensions, this type of joint is a tubular element the central part of which has a sinusoidal shape similar to bellows.

The shape and the arrangement of the joint 110 in the housing of the cylinder 20 are such that a large air pocket 115 exists and fills a very large part of the annular volume between the cylinder and the joint opposite the piston. The humans skilled in the art will value that, through such recess, the pressure and consequently the friction force exerted on the piston is highly reduced with respect to a rigid body made of a polymer material, such as O-rings, while preserving a good sealing.

The embodiment shown in FIGS. 23 and 24 shows a joint 110, the central part 112, 114 of which is curved toward the center thereof and the middle 114 of the curve slightly touches the piston 23 thus providing a tight connection with low friction force or low contact pressure. The lower part and the upper part 113 and 111 of the tubular elements are arranged so as to fulfill the other functions of the joint, as described hereinafter.

The lower part of the joint 110 is arranged so as to form a sealing connection with the internal wall of the cylinder 20. For this purpose, a rigid ring 116 made of a metal or a rigid polymer, for example, pushes the lower portion 113 towards the wall of the cylinder 20. A groove or a hollow part 117 is found in the wall of the cylinder 20, which stops or locks the rigid ring 116. Thus the joint 110, and more particularly the lower part 113 are immobilized in the cylinder.

The upper end 111 of the joint 110 is shaped in a cylindrical form the cylinder and is stopped by a halting ring 119, locked as the holding washers described above.

It should also be noted that, according to the embodiment shown in FIGS. 23 and 24, the profile of the internal face of the cylinder 20 includes a narrow part 118 reducing the internal diameter thereof at the level of the joint housing. The zone of such rim 118 makes it possible to control, for example to position closer, the position of the lower part 113 and ring 116 with respect to the piston 23. In this way, the friction force and the sliding provided by the joint on the piston can be better adjusted.

Figures 25, 26:
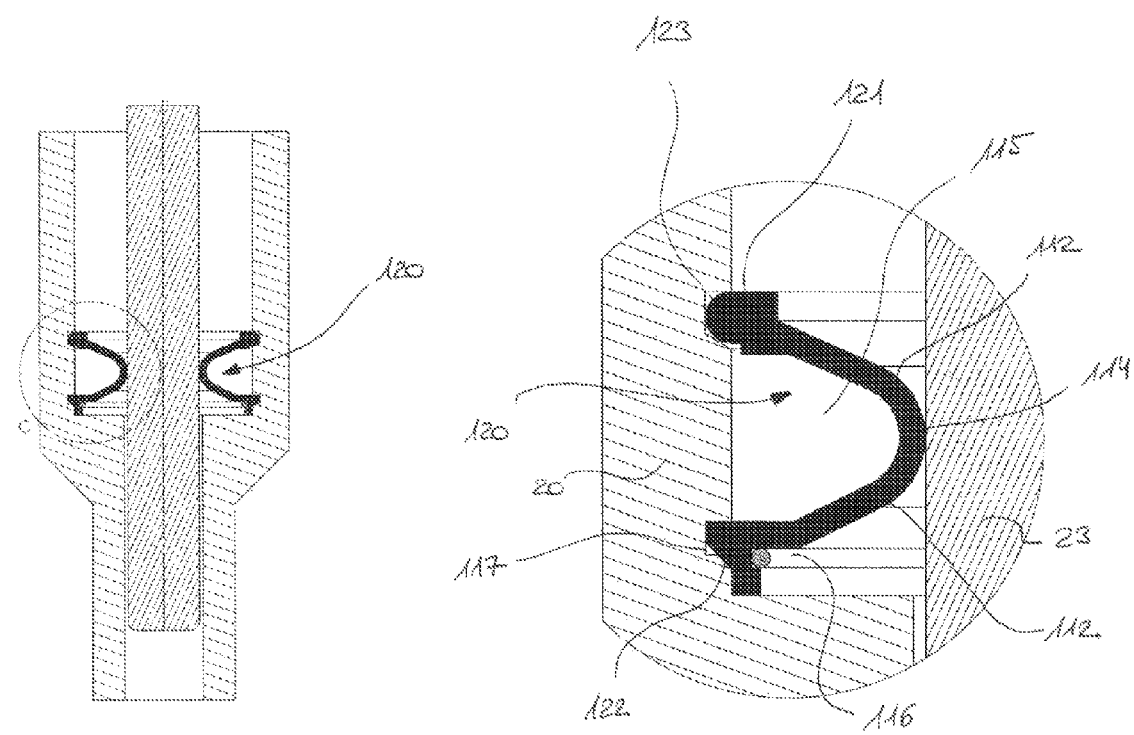
FIG. 25 is an axial cross-sectional view of a second embodiment of the second implementation of the device of the invention.
FIG. 26 is an enlarged view of detail C of the device in FIG. 25.

FIGS. 25 and 26 show a joint 120 based on the same concept as the one in FIGS. 23 and 24 with a few differences in the embodiment however. More particularly, the holding washer 119 intended to lock the vertical displacement upwards of the joint 110 in FIGS. 23 and 24 does not appear in FIGS. 25 and 26. It is replaced by a widened structure 121 of the upper end joint 120, which characterizes such embodiment by giving a high rigidity, so that it can then fulfil the function of anchoring the joint 120 upward. For this purpose, the widened structure 121 is engaged in a groove 123 of the internal wall of the cylinder 20 thus preventing any vertical movement of the upper parts of the joint 120.

The lower part 112 of the joint also includes a widened part 122 which cooperates with the groove 117 as described in the preceding paragraph for the upper end of the joint 120. However, in order to provide a sealing connection between the joint 120 and the internal wall of the cylinder 20, a rigid ring 116 is provided to press the lower part 122 of the joint towards the internal face of the cylinder 20.

Figure 27:
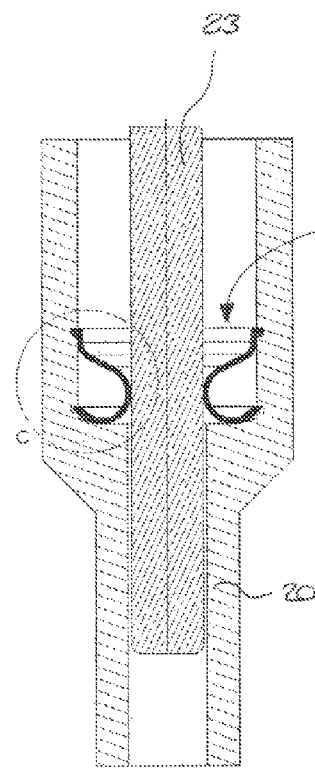
FIG. 27 is an axial cross-sectional view of a third embodiment of the second implementation of the device of the invention.
Figure 28:
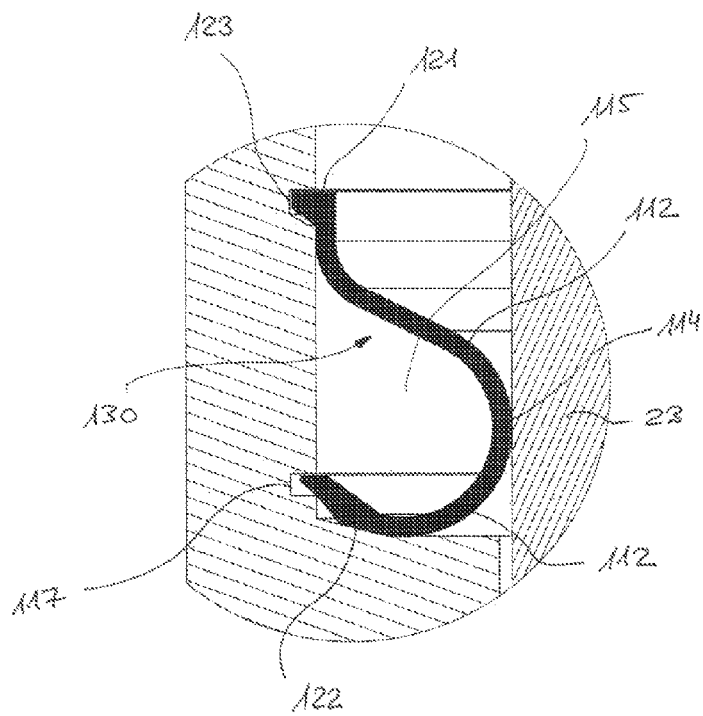
FIG. 28 is an enlarged view of the detail C of the device of FIG. 27.

FIGS. 27 and 28 show other alternatives of the joint according to the concept described with reference to FIGS. 23-26. In principle, the sealing of the joint 130 against the piston 23 is embodied in FIGS. 23-26, but the anchoring in the housing of the cylinder 20 is modified by the modification in the ends of the joint 130.

Figure 29:
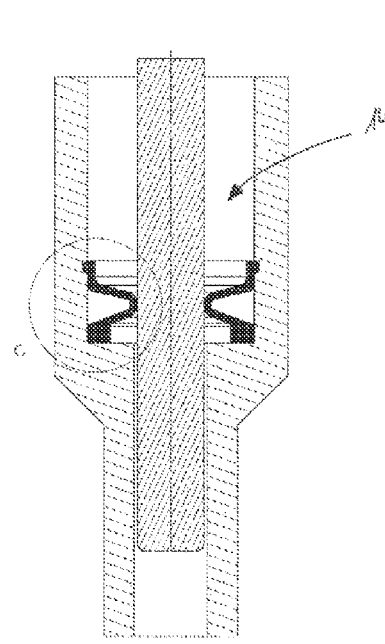
FIG. 29 is an axial cross-sectional view of a fourth embodiment of the second implementation of the device of the invention.
Figure 30:
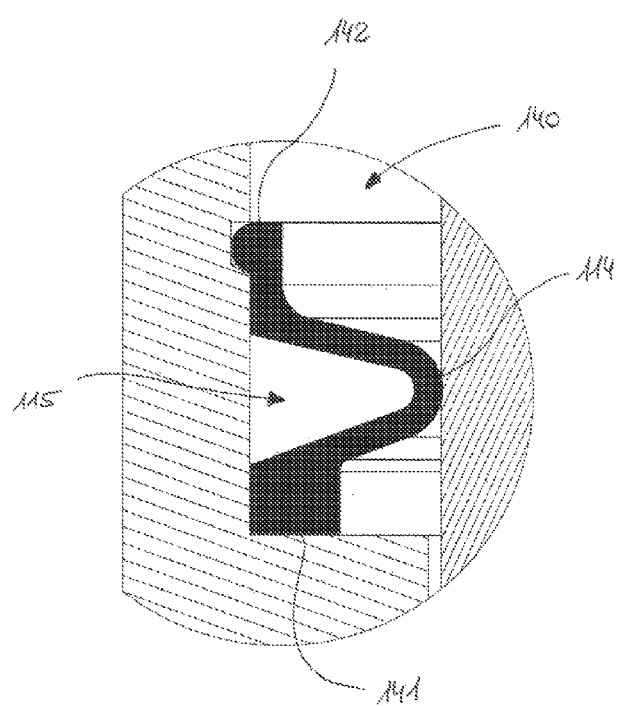
FIG. 30 is an enlarged view of detail C of the device in FIG. 29.

This is also the case in the embodiment of FIGS. 29 and 30, which shows a joint 140 with a lower end 141 sufficiently voluminous and thus rigid to provide both the anchoring of the joint in the housing thereof and the sealing against the internal wall of the cylinder 20. A ring or a rigid ring like that in FIGS. 23-26 is no longer necessary.

Figure 31:
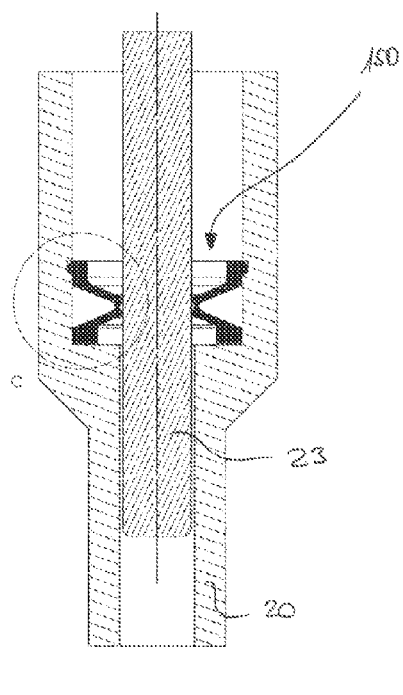
FIG. 31 is an axial cross-sectional view of a fifth embodiment of the second implementation of the device of the invention.
Figure 32:
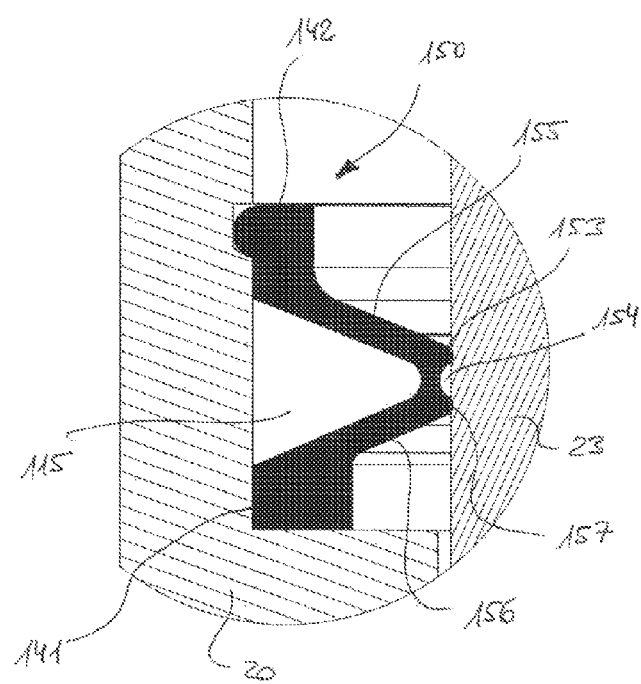
FIG. 32 is an enlarged view of detail C of the device in FIG. 31

FIGS. 31 and 32 show an alternative of the concepts in FIGS. 23-30 in that the curved shape oriented towards the axis of the piston and the proximal zone of which is in contact with the piston includes, in a view showing the semi-profile in FIG. 32, two summits which form rounded contact points 153 and 157, and thus creating a closed space 154 limited by the joint 150 and the piston 23. Considering the joint 150 cylinder 20 and piston 23 assembly in three dimensions, it clearly appears that the contact points 153 and 157 are hollow contact rings or cylinders coaxial with the piston 23 and located in parallel planes. Similarly a closed space 154 has a three-dimensional shape of a ring.

The closed space 154 of the joint 150 has the same function as the closed space 30 shown, for example, in FIG. 5 or in greater details in FIG. 6. Such space is used as a tank for the lubricant and thus contributes to the correct sliding upon the vertical movement of the piston 23 along its axis, upon the metering.

Figure 33:
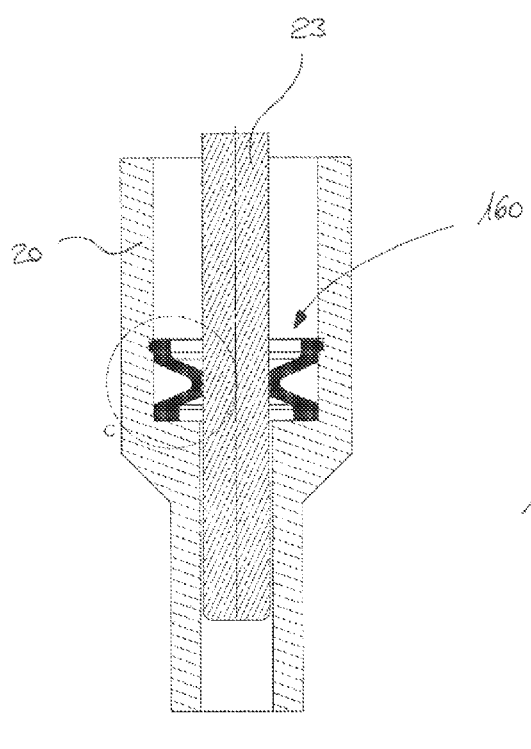
FIG. 33 is an axial cross-sectional view of a sixth embodiment of the second implementation of the device of the invention.
Figure 34:
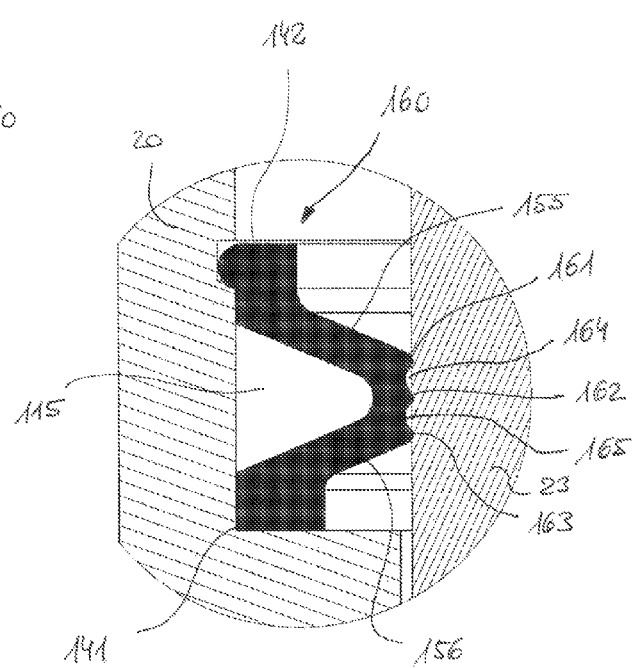
FIG. 34 is an enlarged view of detail C of the device in FIG. 33.

FIGS. 33 and 34 show an extension of the principle shown in FIGS. 31 and 32 with a joint 160 which includes, according to the half-profile in FIG. 34, three rounded points 161, 162, 163 of contact with the piston 23 enclosing two closed spaces 164 and 165. As in both previous examples, the contact points are located in a central zone of the joint limited upwards and downwards by portions of the joint 160 having a shape of inverted conical walls 155 and 156.

It should be noted that the joint 160 assembly is relatively rigid, inclusive of the curved zone, but that this fact is partially compensated by the rounded contact zones 161, 162, 163 which are small and easily deformable upon the starting-up of the piston, which enables the regeneration of a lubricant interface film and reduces the friction force per contact zone.

For producing the joints according to the invention, molded elastomers of the FPM type preferably resisting a temperature from 15 to 150° C. can be used, which makes the usual utilization/sterilization range for laboratory instruments. Examples of such elastomers are silicone, butyl rubber, ethylene copolymers and propylene copolymers, as well as fluoride vinylidene and hexachloropropylene copolymer, among others.

According to the invention, additional methods are proposed to further reduce the friction forces of an elastomer, more particularly the adhesion forces at rest (creation on a surface of repulsion-responsive groups). The peripheral treatment of the joint and/or the adjunction of internal lubricants (whether solid or liquid) are techniques according to the invention. One cites, among others, the creation of microtanks of lubricants by "sand-blasting/cryogenization", the halogenization or the surface molecular structural transformation by plasma projection, as well as the incorporation of "alloy" elements in the matrix, with such elements being chosen for example, among fluorinated powders and/or lubricants. If a lubricant is used, it can be simply added or be grafted. It is preferably chosen with a high molecular weight.

In the case where the joint includes an elastomer including, in the matrix thereof, an alloy element, the proportion by volume of said alloy element will be chosen to be smaller than or equal to 30%, preferably smaller than or equal to 25% of the total volume of the elastomer.

According to one embodiment of the device according to the invention, at least a part of the joint is made of a material having a Shore A hardness of less than 75. Preferably, the Shore A hardness of the material will be between 30-75, or 40 to 70. Preferably, any part in sealing contact with the piston will be characterized by the Shore hardness values mentioned above. For example, the lips shown in FIGS. 2, 4-6, 8, 10 and 11-22, or the contact zones 114 in FIGS. 23-30, and 153, 157, 161, 162, 163 of FIGS. 31 to 34, are composed of a material having the Shore characteristics mentioned above.

As mentioned above, the device according to the invention is characterized by the utilization of joint including parts having different geometric characteristics and/or different volumes. Thanks to the characteristics of the joint, it is possible to reduce the friction force exerted by the joint on the piston. The friction force must be $\ll F_{spring}$ which pushes the piston back and the level of which is adjusted to guarantee the contact accuracy against the mechanic stops determining the correct volumetric performances. The friction force generally also depends on the size of the piston and/or the pipetted volume. According to the present invention, friction forces ($F_{stat}=\mu_{stat} \times N$ and/or $F_{dyn}=\mu_{dyn} \times N$) of the order of 2-5 N are obtained from maximum volumes up to 100 ml. For smaller volumes, more particularly maximum volumes of approximately 10 to 20 ml, the friction force may be reduced to about 1N. Finally, for maximum volumes of ≤1,000 µl, the friction force is ≤0.6 N, preferably ≤0.5 N, ≤0.4 N and even ≤0.35 N. The reduced frictional forces enable the utilization of a spring having smaller forces.

The devices of the invention make it possible to meter volumes between 1 µl and 200 ml. For example, the device of the invention may be a pipette or a metering device for metering volumes of 1 to 1,000 µl, 0.1 or 0.2 to 2 ml, 0.1 or 0.5 to 5 ml, and/or 1 to 10 ml.

According to another example, the device of the invention may be an adjustable micropipette covering the volume selected within the ranges of 50-1,000 µl, 10-200 µl, 1-100 µl, 1-50 µl, and 0.5-10 µl.

Preferably, the material can be sterilized at temperatures of approximately 121 to approximately 134° C.

The diameter of the piston of the device may be, for example, of 1.5 to 10 mm. Preferably, the piston of the device has a diameter of less than 6 mm, preferably <5 mm or even <4 mm or even <3.5 mm or even <3 mm.

The pressure variations around the working pressure (atmospheric pressure of approximately 1 bar) generally do not exceed approximately ±0.2 bar, preferably 0.1 bar or even 0.05 bar, depending on the volume.

The invention claimed is:

1. A device for manually metering liquids comprising
a cylinder, and
a piston housed inside the cylinder, with the device being arranged so that during a metering operation, the piston moves along an axis of the piston to suck in or to expel a volume of liquid,
the device further comprising:
a joint housed in the cylinder and arranged so as to provide a sealing between the cylinder and the piston, wherein during a liquid metering operation, the joint remains fixed with respect to a movement of the piston, wherein the joint comprises
a first, external part which cooperates with the internal wall surface of the cylinder and which functions to provide sealing of the joint against an internal wall surface of the cylinder, and,
a second, internal part, which is in contact with the piston and which functions to provide a sealing of the joint against the piston and to exert a friction force on the piston upon the movement of the piston relative to said joint, wherein said first and second parts are made in one piece of a same elastomer material, wherein said elastomer material is in sealing contact with said piston, wherein said first part is more rigid than said second part, wherein the friction force imparted by the joint pressing against the piston surface upon the movement of the piston with respect to the joint is smaller than or equal to 2 N, and wherein the joint comprises at least two distinct contact surfaces with the piston and is arranged so as to form a closed space between said two contact surfaces and the piston.

2. The device according to claim 1, wherein the thickness (c, c') of the second part of the joint, measured at a point of contact of said second part with the piston in a direction perpendicular to the piston axis from said point of contact is smaller than 1 mm.

3. The device according to claim 1, wherein the joint includes at least one recess between said first part and said second part, wherein said recess reduces the mechanical coupling between said first part and said second part.

4. The device according to claim 1, wherein said elastomer material has a Shore A hardness of less than 75.

5. The device according to claim 1, wherein the joint has an annular shape.

6. The device according to claim 1, wherein the joint profile in radial cross-section with respect to the piston axis includes at most one axis of symmetry.

7. The device according to claim 1, wherein the joint is composed of parts made of different materials.

8. The device according to claim 1, wherein the joint is an asymmetric X-ring.

9. The device according to claim 1, wherein said first part of the joint is more voluminous than said second part of the joint.

10. The device according to claim 1, wherein the joint has, in radial cross-section with respect to the piston axis, at least one part having a curved shape, said curved shape being oriented towards the piston axis, wherein a proximal zone of said curved shape is in contact with the piston.

11. The device according to claim 1, wherein the joint has, in radial cross-section with respect to the piston axis, a plurality of parts having curved shapes, said curved shapes being oriented towards the piston axis, wherein, proximal parts of said curved shapes are in contact with the piston.

12. The device according to claim 1, wherein the joint is retained in a space between the internal wall of the cylinder and the piston using at least one retaining ring, openings and/or grooves.

13. The device of claim 1, said device having a nominal or maximum volume of 1000 µl or less, wherein the friction force imparted by the joint pressing against the piston surface upon the movement of the piston with respect to the joint is smaller than or equal to 0.6 N.

14. The device of claim 1, wherein said first part comprises fins protruding from a body of the joint, said fins preventing a vertical upwards movement of the joint.

15. The device of claim 1, wherein said first part further functions to fasten the joint in the cylinder.

16. The device of claim 1, wherein the joint includes at least one recess creating zones defining transitions and/or a connection zone between the first part and the second part.

17. The device of claim 1, wherein the joint is a one piece joint.

18. The device of claim 1, wherein said joint comprises a third part made in one piece with said first and second parts, said third part providing the anchoring of the joint in the cylinder.

19. The device of claim 18, wherein said third part comprises one or more selected from protruding fins, an external rim, an upper bulge, and a stabilizing element made from a different material than said elastomer material.

20. The device of claim 1, wherein said second part comprises a pair of lips, wherein each lip of said pair of lips is in contact with the piston, wherein said two distinct contact surfaces are where the two lips are in contact with the piston, respectively, and wherein said closed space is formed between said pair of lips and the piston.

21. The device of claim 1, wherein said second part comprises a sinusoidal shaped tube defining an air pocket filling part of the annular volume between said cylinder and said joint on the side of the joint that is opposed to the piston.

22. The device of claim 1, wherein said joint comprises a connection zone connecting said first part to said second part, wherein a thickness of said connection zone is less than 1 mm.

23. The device of claim 1, which further comprises a metering button and a spring, wherein said piston slides in said cylinder against and under the effect of a force of said spring, wherein during said metering operation, a user presses on said metering button with his/her thumb against the force of said spring.

24. The device of claim 1, which has a nominal volume in the range of 10 to 20 ml and wherein the friction force imparted by the joint pressing against the piston surface upon the movement of the piston with respect to the joint is from 1 to 2 N.

25. The device of claim 1, wherein said first and second parts of said joint form a tube comprising a wall, wherein said wall, when seen in radial cross-section with respect to the piston axis, has a sinusoidal shape curved towards the axis of the piston.

26. A device for manually metering liquids, said device having a nominal or maximum volume of 20 to 100 ml, said device comprising:
a cylinder, and
a piston housed inside the cylinder, with the device being arranged so that during a metering operation, the piston moves along an axis of the piston to suck in or to expel a volume of liquid,
the device further comprising:
a joint housed in the cylinder and arranged so as to provide a sealing between the cylinder and the piston, wherein during the metering operation, the joint remains fixed with respect to a movement of the piston, wherein the joint comprises
a first, external part, which cooperates with the internal wall surface of the cylinder and which functions to provide a sealing of the joint against an internal wall surface of the cylinder, and,
a second, internal part, which is in contact with the piston and which functions to provide a sealing of the joint against the piston and to exert a friction force on the piston upon the movement of the piston relative to said joint, wherein said first and second parts of said joint are made in one piece of a same elastomer material, wherein said elastomer material is in sealing contact with the piston, wherein said first part is more rigid than said second part, wherein the friction force imparted by the joint pressing against the piston surface upon the movement of the piston with respect to the joint is from 2 to 5 N, and wherein the joint comprises at least two distinct contact surfaces with the piston and is arranged so as to form a closed space between said two contact surfaces and the piston.

27. The device of claim 26, wherein a thickness (c, c') of the second part of the joint, measured at a point of contact of said second part with the piston in a direction perpendicular to the piston from the point of contact is smaller than 1 mm.

28. The device of claim 27, comprising a contact surface where said second part is in contact with the piston, wherein said point of contact is in said contact surface, wherein said thickness (c, c') of said second part of the joint, measured at a point of contact with the piston in a direction perpendicular to the piston from the point of contact, is smaller than 1 mm on whole of said contact surface.

* * * * *